May 17, 1938.    J. H. WIERSMA    2,117,780
COOKING UTENSIL
Filed April 24, 1937    2 Sheets-Sheet 2
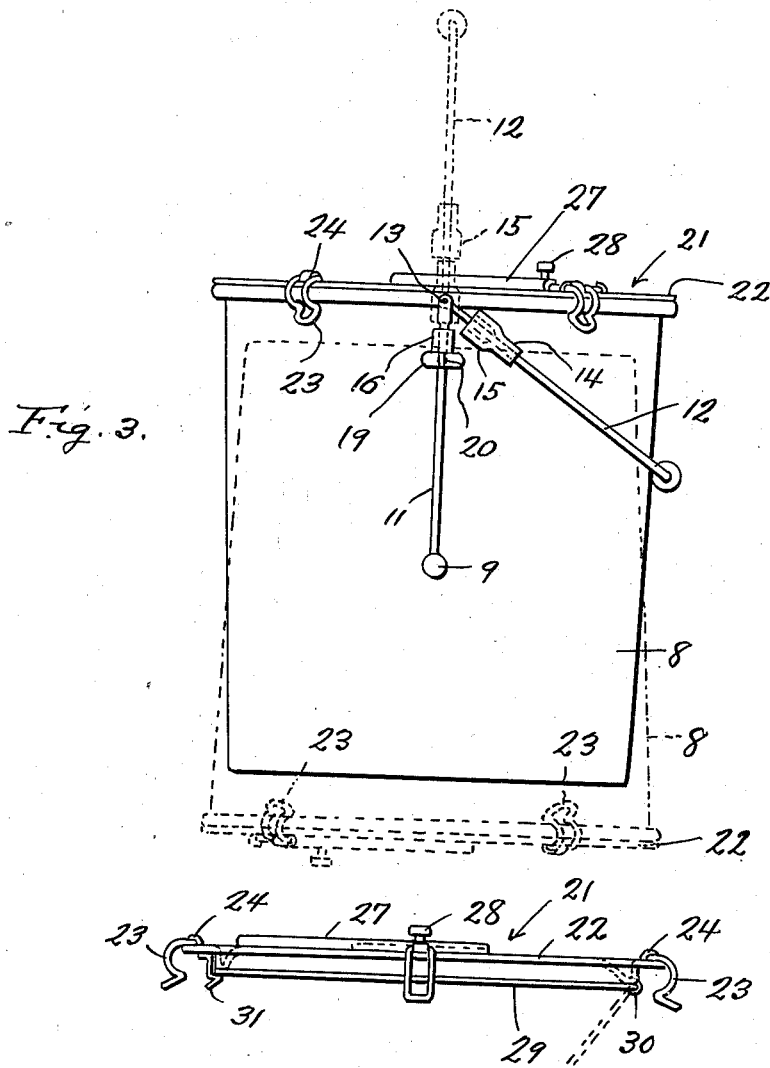
Inventor
John Henry Wiersma
By Clarence A. O'Brien
Hyman Berman
Attorneys Patented May 17, 1938

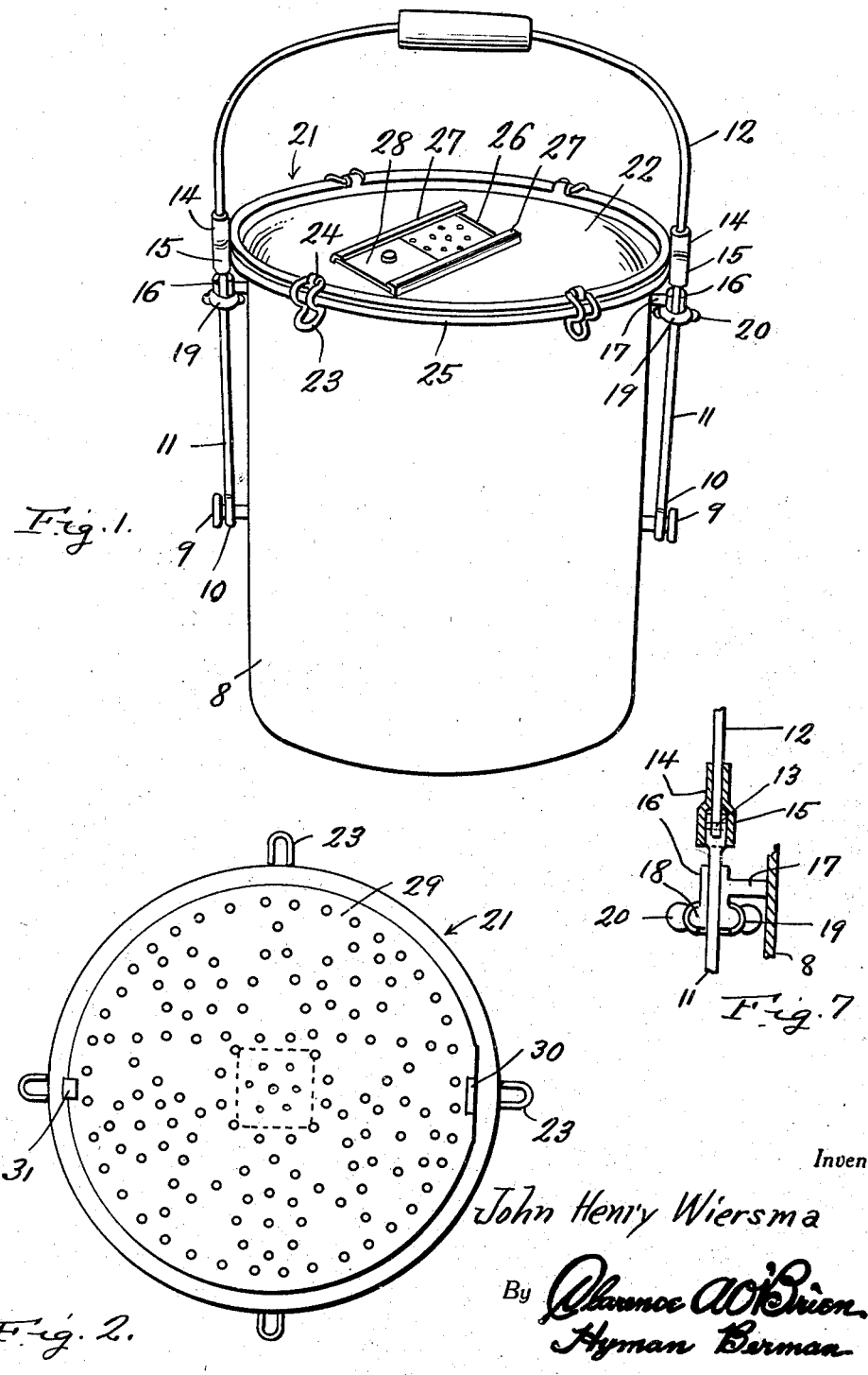

2,117,780

UNITED STATES PATENT OFFICE 2,117,780

COOKING UTENSIL

John H. Wiersma, Chicago, Ill.

Application April 24, 1937, Serial No. 138,855

3 Claims. (Cl. 53—8)

This invention relates to an improved cooking utensil for general household and culinary usage, and the principal purpose is to provide a novel contribution to the trade and art possessed of appreciable refinements and structural distinctions whose cumulative coaction fulfill needed requirements.

The preferred embodiment of the invention, when reduced to practice, is in the nature of a cooking pot or vessel having features incorporated therein to facilitate handling and drainage, this being accomplished through the instrumentality of a closure unit characterized by a lid and a hinged colander, the two features cooperating for efficiency in straining and practicable cleansing to promote sanitation.

More specifically, I have developed an ingenious cooking pot cover characterized by a valved steam discharge opening, and a permanently attached hinged sieve or colander disk.

A further feature of the improvement has to do with a sectional carrying and handling bail, this having portions pivotally attached to diametrically opposite sides of the vessel at a point below dead center, and retaining means being provided to normally maintain the bail in a lifting and carrying position, the means being releasable to allow the then topheavy pot to tilt substantially automatically into a sink or the like to drain surplus water from the contents.

An additional object is to provide a sectional handle construction wherein the bail proper is hingedly attached to pivoted adapter rods, whereby to permit the bail to be collapsed to an out-of-the-way position when the vessel or pot is not in use.

Other features and advantages will become more readily apparent from the following description and drawings.

In the drawings:

Figure 1 is a perspective view of the multiple purpose combination pot or cooking vessel constructed in accordance with the principles of the present invention, the bail or handle being shown in its locked upright carrying position.

Figure 2 is a bottom plan view of the cover showing the strainer disk or colander.

Figure 3 is a side elevation of Figure 1 which portrays to advantage how the hinged bail may be swung down to an out-of-the-way or collapsed position.

Figure 4 is an edge elevational view of the cover removed from the pot, showing, in dotted lines, the colander swung to open position.

Figures 5 and 6 are perspective drawings of certain of the details forming the keeper means to be hereinafter specifically described.

Figure 7 is a fragmentary detail view showing the keeper or retention means to better advantage.

In the drawings the pot, which may be of any appropriate material and dimensions, is denoted by the numeral 8. On diametrically opposite sides and at a point slightly below what may be called dead center, I provide headed studs 9 to accommodate hinging or pivot eyes 10 on the adjacent lower ends of the adapter rods or arms 11. The arms normally extend up alongside of the body of the vessel to accommodate the wire bail 12. That is to say, the free ends or arms of the bail 12 are pivotally attached, in any suitable manner, as at 13, to the upper ends of the pivoted adapted rods 11. In this connection, attention is called to the slidable sleeves 14 mounted on the ends of the bail; the sleeves having socket portions 15 to slip down over the pivot joints 13 to fasten the bail unit 12 rigidly to the hinging unit composed of said adapter rods 11. When the bail is thus fastened in place, as shown in Figure 1, the features 11 and 12 provide, collectively, a U-shaped carrying bail whose portions 11 are hingedly attached as at 10 to a point below dead center to render the upper portion of the pot topheavy and to facilitate tilting it for drainage into a sink.

I next call attention to the locking or retaining means for holding the bail means (11 and 12) in the rigid upright or carrying position seen in Figure 1. The means for accomplishing this is located on diametrically opposite sides of the upper portion of the bucket or vessel, and comprises what may be called a channeled member 16. This might otherwise be called a U-shaped keeper, and it is rigidly attached to the vessel by a connecting stem 17. At its lower end it terminates in an outstanding flange or bead 18 which serves to accommodate a rotary horseshoe-shaped locking collar 19. The collar is provided with outstanding finger-grips 20 to facilitate rotation. By swinging the members 11 up into the keeper brackets 16 and then turning the collar around so that the collar bridges the open side of the bracket, it is evident that said adapter members 11 are locked rigidly in perpendicular position. This is shown for instance in Figure 1. Then in Figure 7 we see one of the collars swung around to its unlocked position, which exposes the adapter rod 11, allowing it to be free to swing on its pivot 10.

When it is desired to put the pot away with other utensils in a kitchen cabinet or elsewhere, the sleeves 14 are grasped and slid up on the arms of the bail to allow the hinged joints 13 to come into play and to permit the said bail 12 to swing down to a collapsed out-of-the-way position illustrated in Figure 3. Hence, we have a sectional or collapsible bail construction characterized by the features 11 and 12, collectively, these being connectible together by the hinge joints 13 and retention sleeves 14. Then the whole bail as a unit can be locked in rigid position by way of the keeper brackets 16 and locking collars 19 cooperable therewith.

Now, as to the cover, this is generally denoted by the numeral 21. It comprises a circular or disk lid 22 having hinged hooks, that is, hooks 23 hingedly mounted at 24 to snap down over the bead or rim 25 on the vessel or pot. In the lid is a pouring opening 26. On opposite sides of this are tracks or channels 27 to accommodate a sliding valve plate 28 which is closed for cooking and slid to open position for pouring or drainage. The aforementioned colander or sieve is denoted by the numeral 29 and this is in the form of a disk hingedly mounted at 30 in parallelism with the under side of the lid. It is normally maintained in straining position by spring latch 31 carried by the lid.

In practice the device is used like any other cooking pot. When, however, it is desired to drain the water from the contents of the pot, the valve plate 28 is slid to open position. Then the collars 19 are released to allow the bail, made up of the features 11 and 12, to be free. The pot being topheavy because of the pivotal connections 9 and 10 automatically tilts to draining position. Naturally, this is accomplished by resting the pot on the edge of a sink and fulcruming it thereon to drain the water through the screened aperture 26 in an obvious manner. Or if desired, the entire pot can be turned upside down, as indicated in dotted lines, while suspended from the locked bail for quick draining.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a vessel of the class described, a pot, a pair of rod members pivotally attached at their lower ends to diametrically opposite sides of the pot, U-shaped keeper brackets fixedly mounted on diametrically opposite portions of the upper part of the pot, the adjacent ends of said rod members being releasably engageable with said keeper brackets, rotary retaining elements mounted on said brackets for retaining and releasing the rod members, and a U-shaped bail having its ends hingedly attached to the upper ends of said rod members, and sleeves on the ends of said bail including coupling sockets usable in the manner and for the purposes described.

2. As a component part of an assemblage of the class described, a cover for a pot including a lid, said lid having a draining opening, a slidable plate valve for normally closing said opening, a disk-like colander attached hingedly to said lid, and a latch carried by the lid to maintain the colander in spaced parallelism with the lid.

3. In a vessel and closure, a pot, a pair of straight rod members pivotally attached at their corresponding lower ends to diametrically opposite sides of the pot, a pair of U-shaped keeper brackets having horizontal shank portions attached to diametrically opposite side portions of the pot adjacent the upper open end thereof, the adjacent upper ends of said rod members being releasably engageable with said keeper brackets, locking collars mounted for rotation on said keeper brackets for seating and maintaining said rod members in place, a carrying bail having its opposite ends hingedly attached to the upper ends of said rod members, and coupling sockets slidable on the end portions of the bail and adapted to be slipped over the hinging joints to temporarily join the bail and rod members for simultaneous operation.

JOHN H. WIERSMA.